Dec. 6, 1932.  G. K. BEDUR  1,890,278
FLEXIBLE COUPLING
Filed May 14, 1929
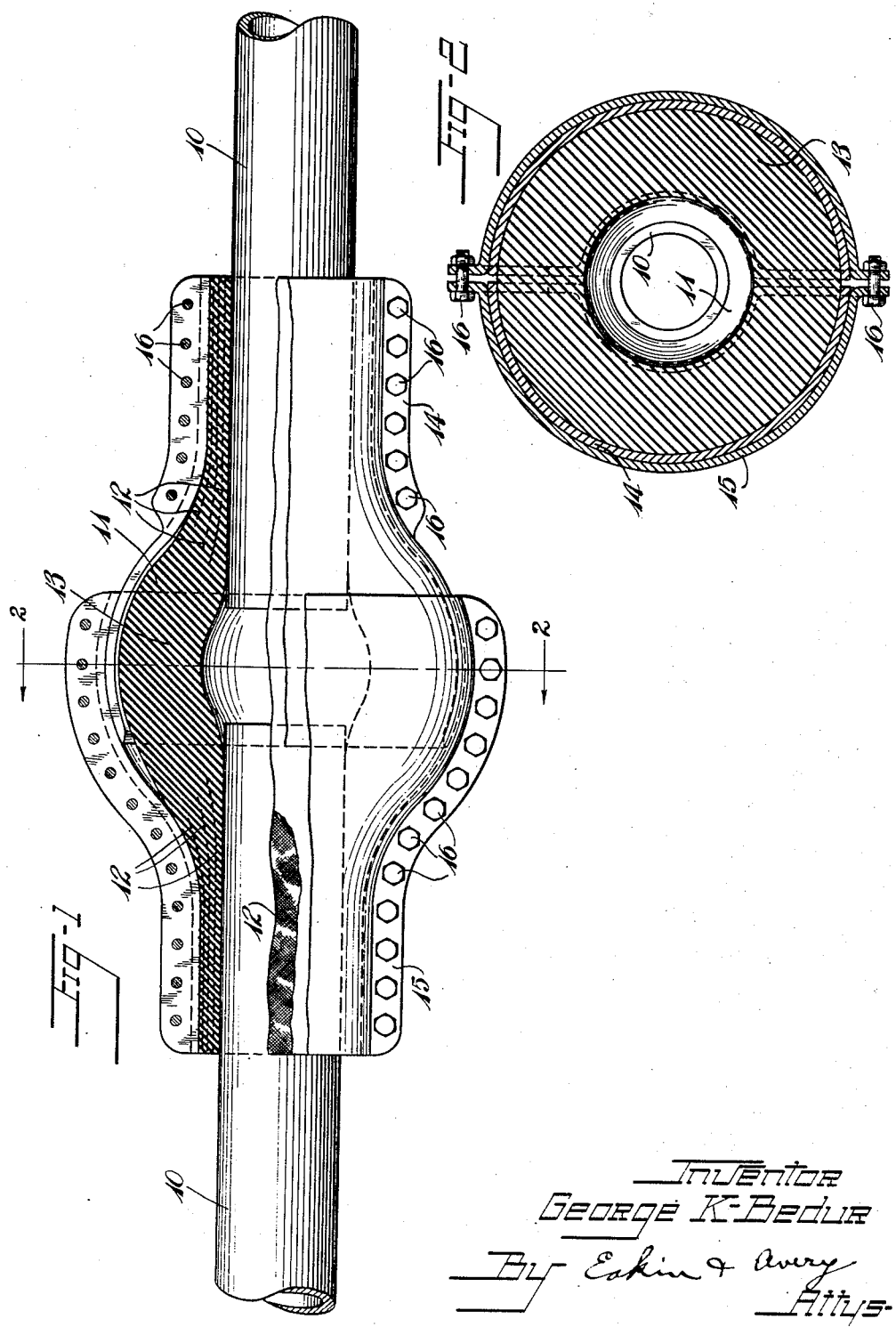
Inventor
George K. Bedur
By Eakin & Avery
Attys.

Patented Dec. 6, 1932

1,890,278

UNITED STATES PATENT OFFICE

GEORGE K. BEDUR, OF AKRON, OHIO, ASSIGNOR TO THE B. F. GOODRICH COMPANY, OF NEW YORK, N. Y., A CORPORATION OF NEW YORK

FLEXIBLE COUPLING

Application filed May 14, 1929. Serial No. 362,965.

This invention relates to flexible couplings, and especially flexible tubular connections used between adjacent sections of a fluid-conducting conduit.

The invention is especially useful in a dredger-sleeve for connecting adjacent lengths of pipe constituting the discharge conduit of a suction dredge, where the respective pipe lengths are supported upon pontoons and the conduit is subject to the action of waves, tides, winds, or currents which cause relative angular movement of its sections. The conduit is required to convey and discharge the mixture of mud, sand and water sucked up by the dredge, and is required to withstand the abrasive action and pressure of such material.

Heretofore the sections of dredge-discharge conduits usually have been connected by tubular sleeves of uniform diameter comprising rubber to resist abrasive action and fabric to provide strength against bursting. In such sleeves deterioration is very rapid as soon as the rubber portion is worn through.

The chief objects of this invention are to provide a flexible coupling for purposes such as that mentioned in which the wear-resisting element may be easily removed and replaced when worn; to provide a flexible coupling having a superior wear-resisting structure; to provide a tubular flexible coupling that will flex without kinking; to provide a coupling having great strength against bursting; and to effect economy of operation.

Of the accompanying drawing:

Fig. 1 is a side elevation of the adjacent ends of two conduit sections, and my improved coupling in its preferred form associated therewith, a portion of the coupling being broken away and in section.

Fig. 2 is a section on line 2—2 of Fig. 1.

Referring to the drawing, 10, 10 are adjacent sections of an articulated conduit, and 11 is a tubular flexible coupling member or sleeve connecting the adjacent spaced apart ends thereof. The sleeve 11 is composed of resilient, abrasion-resisting rubber, and its end portions, which telescope over the end portions of the respective conduit sections 10, are suitably reinforced with layers of fabric 12, 12. The medial portion of the sleeve 11 has its wall considerably thickened, and is bulged outwardly as is clearly shown at 13, Fig. 1, and the outer face of the bulged portion 13 is spherical in the middle zone of the member.

The end portions of the sleeve 11 are secured to the respective end portions of the sections 10 by respective clamps 14, 15, each of which comprises two longitudinal sections formed with external attachment flanges along their longitudinal margins, and the clamp-sections are drawn together tightly to embrace the sleeve ends by bolts 16, 16 through said flanges. The clamp 14 is longer than half the length of the sleeve 11, and is shaped to fit loosely the bulbous middle portion thereof, and the clamp 15 is substantially the same length as the clamp 14 and overlies the latter upon said middle portion of the sleeve, the marginal flanges of the clamp 14 terminating somewhat short of the clamp 15 so that the clamps may move angularly with relation to each other in the manner of a ball and socket joint.

The sleeve 11 is completely surrounded by the clamps 14, 15 so that the resilient bulbous middle portion of the sleeve is not excessively distended by the pressure of the material passing through the conduit. The resilient character of the material of the sleeve permits it to flex easily when the conduit sections move angularly with relation to each other, and the concave form of the inner surface of the sleeve, at the middle thereof, permits displacement of the rubber on the compression side of the flexure without such kinking as to restrict the flow of material through the coupling, the outwardly bowed wall on the compression side simply bending to a shorter radius of curvature, with no inward bowing of the wall.

The middle portion 13 of the sleeve 11, which traverses the space between the ends of the conduit sections 10, is relatively thick as compared with dredging sleeves heretofore used, with the result that it will withstand the abrasive action of the material passing through the sleeve for a much longer period.

The relatively small amount of reinforcing material incorporated in the sleeve 11 makes for economy of cost, and although the initial cost of the complete coupling possibly is more than the cost of couplings heretofore used, the lower replacement cost of worn sleeves effects economy of operation.

The invention may be modified within the scope of the appended claims, and I do not limit my claims wholly to the specific construction shown and described.

I claim:

1. In a flexible pipe-coupling, the combination of a flexible tubular structure anchored at axially spaced positions and having both its inner and its outer faces normally bowed outwardly intermediate its anchorages, and a strain-resisting structure in such bracing relation to the outer surface of said tubular structure as to resist outward expansion of the latter with substantial uniformity over the entire axial extent of the latter between the anchorages, the material of said bowed portion being resiliently stretchable and compressible in an axial direction.

2. A flexible pipe coupling comprising, in combination, an articulated metal sheath having a substantially spherical middle portion, and a tubular flexible member having a bulbous middle portion conforming at its exterior substantially with the inner surface of the middle portion of the sheath, the middle portion of said flexible member having a thickened wall of resilient rubber composition.

3. A flexible coupling for spaced apart ends of adjacent pipe sections comprising a tubular flexible member having a bulbous middle portion, said portion having a thickened wall of resilient rubber composition peripherally concave at its interior and adapted to accommodate itself to flexure of the coupling substantially by compression and extension of the rubber axially of the pipe sections without constricting the pipe passage.

In witness whereof I have hereunto set my hand this 1st day of May, 1929.

GEORGE K. BEDUR.